May 26, 1959

T. FRAYER 2,888,104

HYDRAULIC BRAKE OPERATING CYLINDER AND
RELEASING GRIP COMPENSATOR THEREFOR

Filed Nov. 21, 1956

INVENTOR.
THEODORE FRAYER

BY

*R. L. Miller*
ATTORNEY

May 26, 1959

T. FRAYER 2,888,104

HYDRAULIC BRAKE OPERATING CYLINDER AND
RELEASING GRIP COMPENSATOR THEREFOR

Filed Nov. 21, 1956

INVENTOR.
THEODORE FRAYER

BY

*P. L. Miller*
ATTORNEY

United States Patent Office 2,888,104
Patented May 26, 1959

2,888,104

HYDRAULIC BRAKE OPERATING CYLINDER AND RELEASING GRIP COMPENSATOR THEREFOR

Theodore Frayer, North Canton, Ohio, assignor to The Goodyear Tire & Rubber Company, Akron, Ohio, a corporation of Ohio Application November 21, 1956, Serial No. 623,613

4 Claims. (Cl. 188—73)

This invention relates to hydraulic brake operating cylinders having a releasing grip compensator operated by hydraulic pressure.

In hydraulic brakes for the wheels of aircraft, it is usual to provide a brake disc suspended from and rotatable with the wheel and a plurality of brake shoes movable axially into and out of frictional engagement with the brake disc, movement of such brake shoes being made possible by brake operating cylinders operated by hydraulic pressure and supported adjacent the brake disc by a nonrotatable support.

It is desirable to effect brake engagement with displacement of a minimum amount of hydraulic fluid and to this end, it is also desirable to maintain a definite amount of brake clearance and to compensate for wear of the brake shoes by providing for adjustment of means at the cylinder.

While a number of constructions have been proposed for automatic pin adjustment, or in other words, automatic means whereby the inoperative position of the brake operating piston is automatically adjusted whenever brake wear exceeds a certain amount, such devices have not always fully released the brakes when desired due to the fact that recovery of brake supports from strain undergone in braking or dishing of the brake disc in use have brought about over-adjustment resulting in a dragging brake.

This invention has for its object to provide for hydraulic operated automatic clearance adjustment of the brake.

Another object of the invention is to eliminate the use of torque wrenches or the like.

Still another object is to provide a construction employing parts which may be accurately machined.

A further object of the invention is to provide an automatic brake clearance adjusting mechanicm including means for controlling the gripping means to release it when over-adjustment occurs.

A further object of the invention is the provision of automatic wear compensating mechanism in a hydraulic brake and including means for quickly releasing the mechanism to allow repositioning of the brake piston and the insertion of new friction block linings.

These and other objects will appear from the following description and the accompanying drawings.

Figure 1:
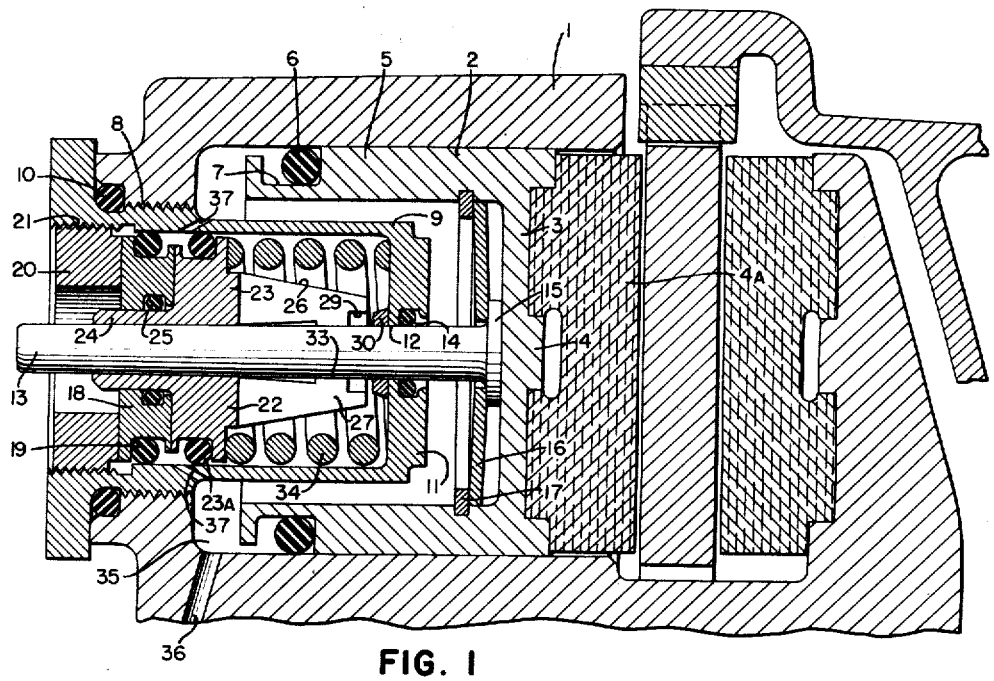
Fig. 1 is an axial cross-sectional view of portion of the brake with the operating cylinder having its piston in its retracted position, the brake cylinder support and brake disc also being shown.

Referring to the drawings, the numeral 1 designates a brake operating cylinder in which a piston 2 is slidably mounted. The piston has a closed head 3 mounting a retaining button 4 for holding a brake shoe 4a of friction material. The piston has its skirt 5 sealed to the cylinder 1 by an O-ring 6 sealed in a peripheral groove 7 of the piston.

The rear wall of the cylinder 1 is formed with an axial threaded opening 8 in which is secured a clearance adjusting cylinder 9 of such diameter as to extend within the skirt of piston 2. The cylinder 9 is sealed to cylinder 1 by a sealing ring 10. It has a fixed head 11 located within the piston 2 and having a central aperture 12 through which an adjusting pin 13 extends axially of the cylinder. The adjusting cylinder 9 is sealed to the adjusting pin 13 by an O-ring 14 therebetween. The pin 13 has a head 15 which is secured to piston 2 by a centrally apertured spring disc 16 about the pin 13 and engage a spring ring 17 engaged in a groove of the piston 2.

A removable cylinder head 18 is sealed to the bore of the adjusting cylinder 9 by an O-ring 19 and is adjustably retained in cylinder 9 by an externally threaded ring 20 engaging threads 21 at the open end of cylinder 9.

A deflection-compensating releasing grip 22 is mounted about the pin 13 and comprises a stop collar 23 having an integral tubular sleeve 24 of reduced diameter which extends through a central aperture of removable head 18 and is sealed thereto by an O-ring 25 in a groove of the head 18. At the opposite side of stop collar 23 is a cone shaped body 26 radially slit to provide a multiplicity of axially extending cantilever arms 27 separated by spaces 28. A counterbored recess 29 is formed in the end of the cone shaped body 26 prior to separation of the arms so that the arms 27 jointly define a shallow annular recess. A cam ring 30 has a bore 31 slidable over the pin 13 and has a conical peripheral face 32 larger in diameter than the counterbore 29 so that when forced into the counterbor 29, it will spread the arms 27 apart. The included angle of the conical face of the ring 30 is made greater than the coefficient of friction.

The central bore of the releasing grip 22 is slightly larger than the diameter of the pin 13 throughout its length except for a zone 33 adjacent the counterbore 29 where the bore is slightly less than the diameter of the pin 13 requiring the arms 27 to be spread apart to permit free passage of pin 13. At the zone 33, each arm 27 provides a partially cylindrical pin-engaging face adapted to grip the pin 13. The releasing grip is accurately ground especially at the bore of zone 33.

For holding the releasing grip 22 and the adjusting cylinder 9 in a normal axially spaced relation, in which the cam ring 30 is not engaging with the counterbore 29 and the ends of arms 27 are spaced from the head 11 of cylinder 9, a compression coil spring 34 is mounted within cylinder 9 about the cone shaped body 26 with its ends impinging respectively against the collar 23 of the releasing grip and the head 11 of the cylinder 9. This spring is quite stiff but the grip of arms 27 on pin 13 is sufficient to compress it upon movement of the pin. The collar 23 carries an O-ring 23a slidably sealing against the cylinder 9.

Fluid under pressure for advancing the piston 2, and consequently the brake shoe carried thereby is admitted to the space 35 as through an aperture 36. An aperture 37 of less flow area than the passage 36 through the wall of cylinder 9 permits such fluid to enter the space 38 between cylinder head 18 and the collar 23 of releasing grip 22. The grip of releasing grip 22 on pin 13 normally holds them together as one so that during brake application piston 2 moves to the right from the position seen in Fig. 1 under fluid pressure in space 35 carrying pin 13 and grip 22 with it and compressing spring 34, a distance equaling normal brake clearance. Upon release of fluid pressure, the spring 34 returns grip 22, pin 13 and piston 2 to the brake clearance position of Fig. 1.

Figure 6:
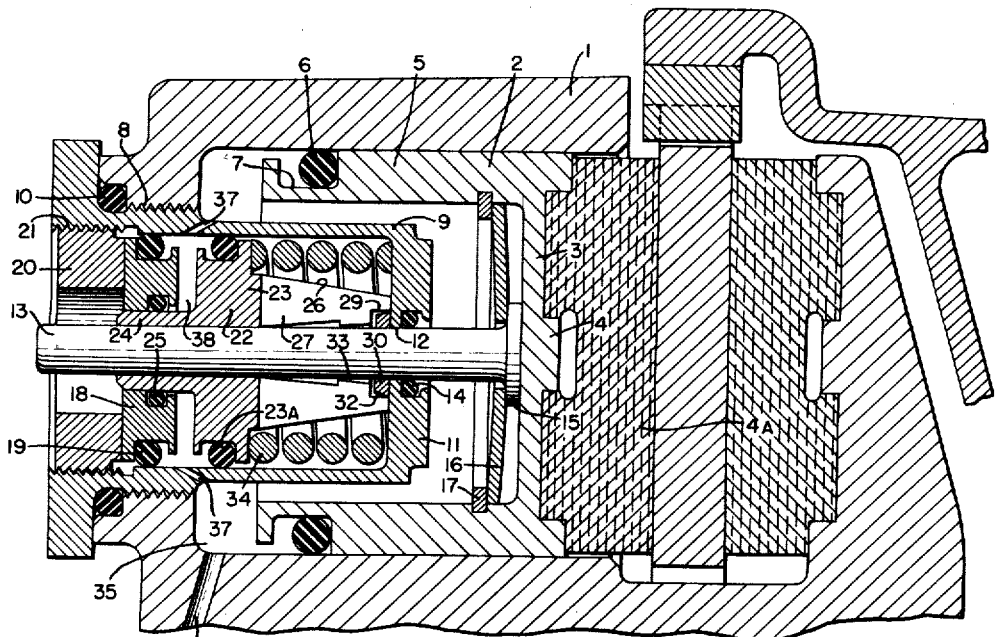
Fig. 6 is a view similar to Fig. 1 but showing the cylinder and piston in brake applied position and the grip completely released to permit automatic return from an over-adjusted position.
Figure 2:
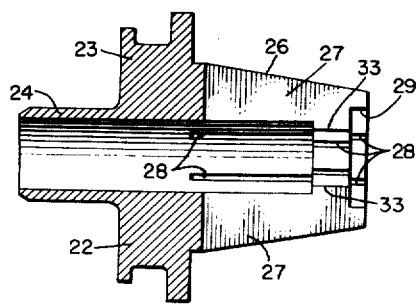
Fig. 2 is an axial cross-sectional view of the releasing grip.
Figure 3:
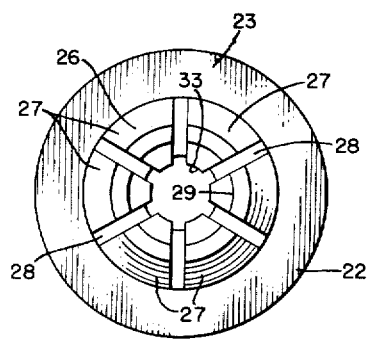
Fig. 3 is an end view thereof.
Figure 4:
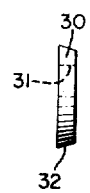
Fig. 4 is a view of the cam ring.
Figure 5:
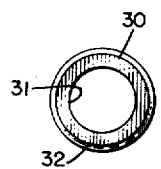
Fig. 5 is a face view thereof.

As the brake shoe wears, as due to housing spring, etc., as hereinafter discussed, so that more than normal movement of piston 2 is necessary to apply the brake, as illustrated in Fig. 6, such excessive movement causes the arms 27 of the grip 22 to advance over cam ring 30 spreading the arms 27 and thereby releasing the grip thereof on pin 13. Spring 34 does not move collar 23 back against cylinder head 18 at this time because with the brake applied fluid under pressure is present behind grip 22 having entered through aperture 37. After grip 22 releases pin 13, the pin moves to the right of Fig. 1 with piston 2 relative to grip 22. Upon release of fluid pressure by brake release, spring 34 moves arms 27 off ring 30, and the conical angle of the cam ring 30 is such that it readily escapes from the grip of the fingers 27 and releases them so that they return into contact with the pin 13 and grip the same at a new position, and with the final return movement of spring 34 operating through pin 13 to move piston 2 to the left to re-establish brake clearance.

Now should there be spring in the brake support, dish of the brake disc, or the like, permitting deflection of the brake parts beyond normal brake clearance upon brake application and before full braking pressure is applied to the disc, then the cam ring 30 will act as previously described to engage arms 27 and release their grip on pin 13. Upon release of braking pressure, the deflected parts of the brake assembly will return to their undeflected position and in so doing will apply pressure on the piston 2 to maintain enough fluid pressure between cylinder head 18 and collar 23 to keep arms 27 in engagement with cam ring 30. This allows pin 13 to slide freely through gripping arms 27 until substantially all the deflection is taken out of the brake assembly whereupon spring 34 moves arms 27 off of cam ring 30 as the fluid pressure behind collar 23 drops to thereby allow arms 27 to grip pin 13 whereupon the final movement of spring 34, pin 13 and piston 2 re-establishes brake clearance to prevent brake drag.

It should also be mentioned that should hydraulic pressures above a predetermined design pressure be applied to space 35 (such as would cause excessive brake housing deflection) that the grip of arms 27 on pin 13 is released. This is due to the fact that the high pressure will get between cylinder head 18 and collar 23 via aperture 37 and move the collar against the action of spring 34 to engage arms 27 over cam ring 30 and release pin 13. Thus, with either excessive housing deflection or hydraulic pressures above design pressure, or both, the pin 13 is released.

During movement of the collar 23 towards head 11, any trapped air escapes through the clearance between pin 13 and grip 22.

The head 18 acts as a return stop for piston 2 and its associated pin 13 and grip 22. It may be adjusted by turning the threaded ring 20 in or out to thereby control operative clearance of the brake parts in the off pressure position so that there is no brake drag.

Another advantage of the construction of the invention is that it is very easy to disconnect, in effect, the operation of the compensator as herein described. This is advantageous to facilitate brake relining. More specifically, when the blocks of friction material 4a are badly worn and need replacement, the threaded ring 20 is turned inward to move arms 27 over cam ring 30 (against action of spring 34) to release arms 27 from pin 13. Now the worn friction block 4a is removed from piston head 3, the pin 13 and piston 2 is moved back in cylinder 1 allowing space to insert a new block 4a of friction material which is snapped on the piston head by fastener 4. The ring 20 is turned outwardly to again establish brake operative clearance and reposition the parts in the position of Fig. 1.

Thus, it will be seen that the objects of the invention have been accomplished.

While a certain representative embodiment and details have been shown for the purpose of illustrating the invention, it will be apparent to those skilled in the art that various changes and modifications may be made therein without departing from the spirit or scope of the invention.

I claim:

1. Apparatus for automatically adjusting brake clearance including a rotary member, a fixed cylinder, a block of friction material, a brake-advancing piston slidably received in the cylinder and adapted to move the friction material into engagement with the rotary member, a pin carried by the piston, a collar frictionally gripping the pin, resilient means about the pin and abutting the collar and urging the piston to clearance position, release means in the path of said collar for releasing the grip of the collar on the pin upon movement of the collar into engagement with said release means, structure including an auxiliary cylinder connected to said fixed cylinder by a restricted passage and an annular piston integral with said collar and defining with said auxiliary cylinder a fluid storage space for applying fluid under pressure supplied behind the piston to the side of the collar opposite to the thrust of the resilient means to correct overadjustment of said pin, and adjustable means controlling the stop position of the collar as occasioned by movement of the resilient means and adapted to be adjusted to control brake clearance and to move the collar into engagement with the release means.

2. Apparatus for automatically adjusting brake clearance including a rotary member, a fixed cylinder, a block of friction material, a brake-advancing piston slidably received in the cylinder and adapted to move the friction material into engagement with the rotary member, a pin carried by the piston, a collar frictionally gripping the pin, resilient means between the collar and an auxiliary cylinder secured to said fixed cylinder urging the piston to clearance position, release means carried by the auxiliary cylinder for releasing the grip of the collar on the pin upon movement of the collar into engagement with said release means, an auxiliary piston on said collar fitting said auxiliary cylinder, a restricted passage between said fixed and auxiliary cylinders to admit fluid behind said collar for correcting overadjustment, and adjustable means controlling the stop position of the collar as occasioned by movement of the resilient means and adapted to be adjusted to control brake clearance and to move the collar into engagement with the release means.

3. Apparatus for automatically adjusting brake clearance including a rotary member, a fixed cylinder, a block of friction material, a brake-advancing piston slidably received in the cylinder and adapted to move the friction material into engagement with the rotary member, a pin carried by the piston, a collar frictionally gripping the pin, resilient means about the pin and abutting the collar and urging the piston to clearance position, release means in the path of said collar for releasing the grip of the collar on the pin upon movement of the collar into engagement with said release means, structure including an auxiliary cylinder supported by said fixed cylinder and connected thereto by a restricted passage, and an auxiliary piston on said collar and defining with said auxiliary cylinder a fluid storage space for applying fluid under pressure supplied behind the piston to the side of the collar opposite to the thrust of the resilient means, and adjustable means adapted to be adjusted to control brake clearance and to move the collar into engagement with the release means.

4. Apparatus for automatically adjusting brake clearance including a rotary member, a fixed cylinder, a block of friction material, a brake-advancing piston slidably received in the cylinder and adapted to move the friction material into engagement with the rotary member, a pin carried by the piston, a collar frictionally gripping the pin and having spreadable jaws extending in a direction toward said rotary member and having gripping surfaces engaging said pin, resilient means about the pin and abutting the collar and urging the piston to clearance position, cam release means in the path of said collar for spreading said jaws and thereby releasing the grip of the collar on the pin upon movement of the collar into engagement with said release means, and structure including an auxiliary cylinder about said pin supported by said fixed cylinder and connected thereto by a fluid passage of reduced area, and an auxiliary piston associated with said collar and defining with said auxiliary cylinder a fluid storage space for applying fluid under pressure supplied behind the piston to the side of the collar opposite to the thrust of the resilient means.

References Cited in the file of this patent

UNITED STATES PATENTS

| | | |
|---|---|---|
| 2,531,341 | Meador | Nov. 21, 1950 |
| 2,536,269 | Driscoll | Jan. 2, 1951 |
| 2,667,240 | Wilkinson et al. | Jan. 26, 1954 |
| 2,790,515 | Hawley | Apr. 30, 1957 |
| 2,801,712 | Lockhart | Aug. 6, 1957 |
| 2,803,314 | Halibrand | Aug. 20, 1957 |

FOREIGN PATENTS

| | | |
|---|---|---|
| 717,350 | Great Britain | Oct. 27, 1954 |
| 738,034 | Great Britain | Oct. 5, 1955 |